UNITED STATES PATENT OFFICE.

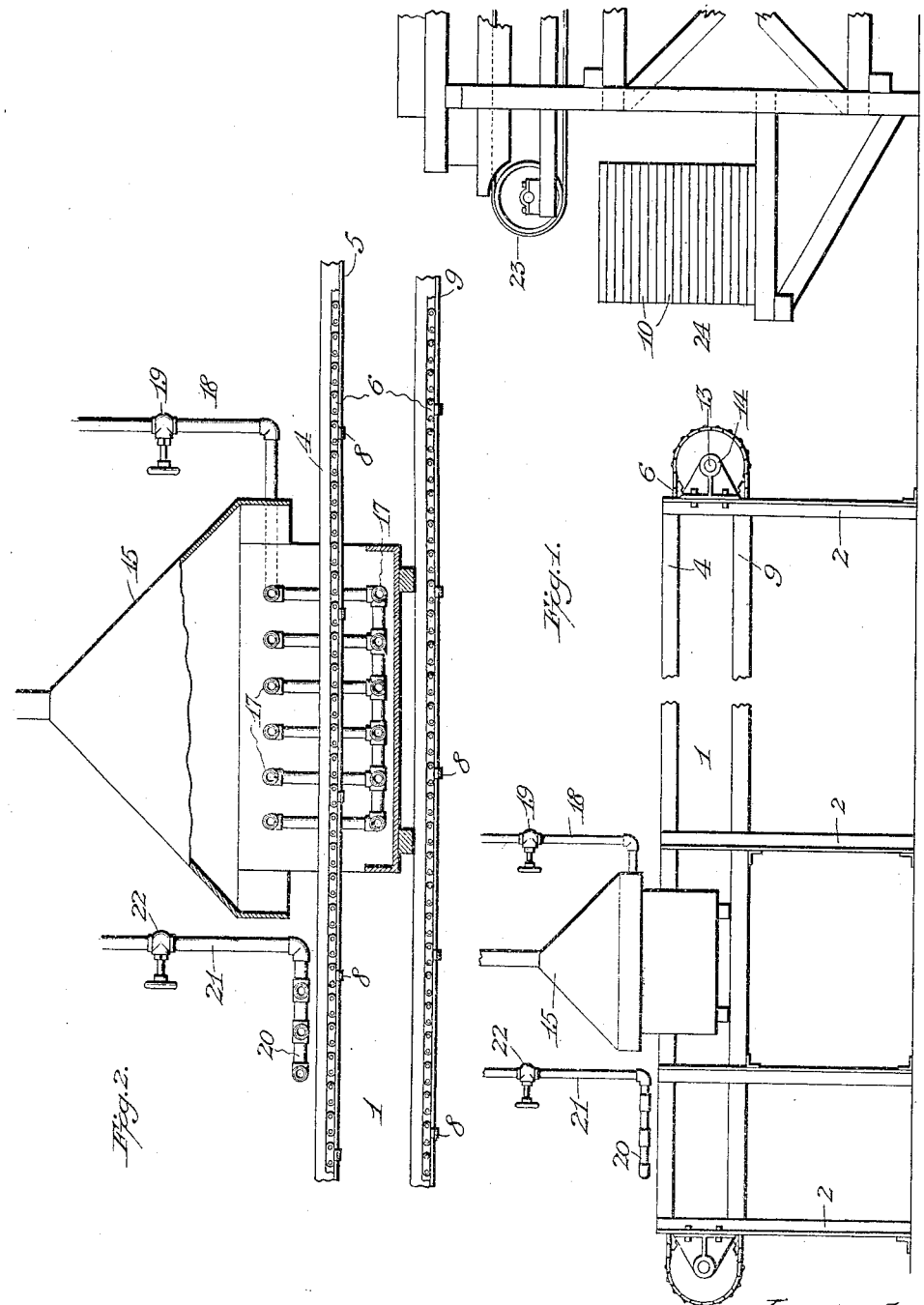

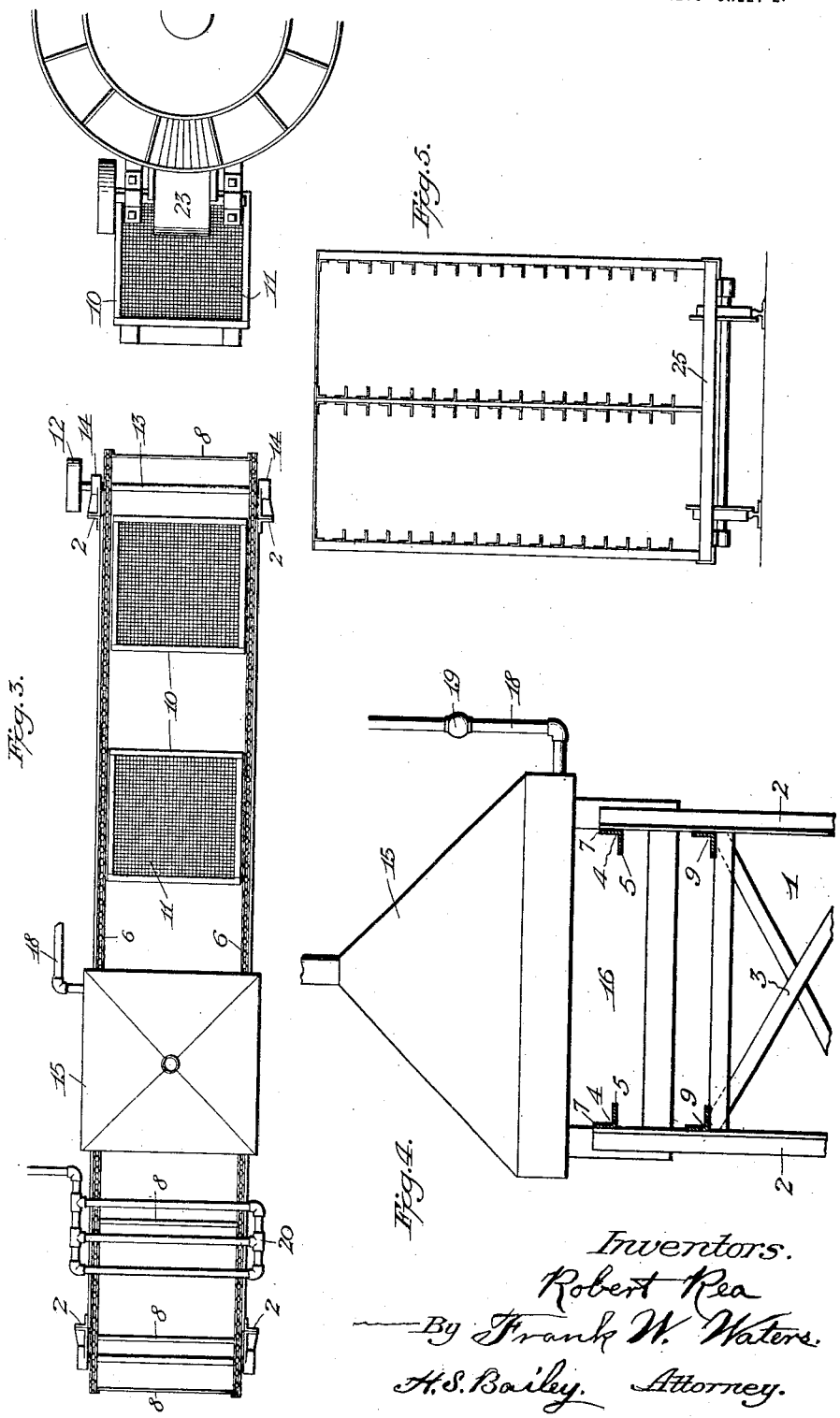

ROBERT REA AND FRANK W. WATERS, OF PORTLAND, OREGON.

CONVEYING AND STEAM AND WATER BLEACHING APPARATUS FOR DEHYDRATING PLANTS.

1,328,395.   Specification of Letters Patent.   Patented Jan. 20, 1920.

Application filed November 29, 1918. Serial No. 264,706.

*To all whom it may concern:*

Be it known that we, ROBERT REA and FRANK W. WATERS, citizens of the United States of America, residing at Portland, county of Multnomah, and State of Oregon, have invented a new and useful Conveying and Steam and Water Bleaching Apparatus for Dehydrating Plants, of which the following is a specification.

Our invention relates to a new and improved conveying and bleaching apparatus for the sliced fruits and vegetables of dehydrating plants, and the objects of our invention are:

First, to provide a sliced fruit or vegetable conveyer that is provided with apparatus for giving to the sliced product suitable bleaching treatment.

Second, to provide for fruit and vegetable dehydrating plants an endless continuously traveling conveyer provided with means for receiving trays having wire screen or other perforated bottoms filled with sliced product, and to provide a conveyer provided with apparatus for imparting to said trays of sliced product a steam or water bleaching treatment while the trays are being moved by the conveyer to a predetermined discharging point.

We attain these objects by the mechanism illustrated in the accompanying drawings, in which:

Figure 1 is a side elevation of the improved conveying and bleaching apparatus.

Fig. 2 is a longitudinal sectional view through the bleaching cabinet or housing, showing manner of supporting the chain conveyer, the upper lap of which passes through said housing, which housing is provided with perforated steam pipes arranged above and below said upper lap, water pipes being also shown which are arranged above the upper lap and outside the housing.

Fig. 3 is a plan view of the mechanism shown in Fig. 1.

Fig. 4 is a transverse vertical sectional view through the conveyer supporting frame and showing the bleaching housing in end elevation; and Fig. 5 is an end view of one of the trucks which support the material receiving screen trays, which are carried by the endless conveyer.

Similar letters of reference refer to similar parts throughout the several views.

Referring to the drawings:

The numeral 1 designates the supporting frame of our sliced fruit and vegetable conveying and bleaching apparatus. This frame comprises legs 2, and cross pieces, preferably of structural angle iron, and flat bars 3, riveted or bolted together. At the opposite sides of this supporting frame at its top edges there is formed an angular shaped slideway, which is formed by angle irons 4, the flat bottoms of which are set so that one leg 5, forms a flat shelf on which the sprocket chain 6 rests, and the other leg 7 projects vertically upward and forms a confining abutment for the sides of each sprocket chain 6, which act to hold it on its slideway shelves against accidental displacements.

In the opposite side slideways 4, of this supporting frame we place sprocket chains 6, which are connected together by suitable cross bars 8, thus making a wide metal chain. This sprocket chain is an endless chain and its lower part runs in slideways 9, similar to the slideways 4. The cross bars 8 are secured at their ends to the sprocket chains, and these cross bars also are positioned to form shelves, and they are spaced at a distance apart that will receive between them the sliced product holding trays. These cross bar members form shallow recesses in which the trays set, and these recesses are formed at equidistant distances apart in the length of the chains.

These trays are a coöperating element of our conveyer, and they consist of a surrounding frame 10, and a bottom portion 11, that preferably consists of a piece of wire screen, the ends of which are secured to the frame. If desired, however, the bottoms of these trays may be made of any suitable metal or material perforated to allow steam or water to flow freely through them.

The sprocket chains are provided with these tray holding recesses at such predetermined distances apart as will readily permit an attendant to place the trays on the continuously moving conveyer and to take them away from the discharging end of the conveyer as fast as they arrive there.

This endless chain tray holding conveyer is driven continuously at a moderate rate of speed by a belt driven pulley 12, that is mounted on a shaft 13, that is journaled in adjustable boxes 14, that are secured to the supporting frame 1, which is constructed to receive them.

On the supporting frame 1, of this endless continuously running conveyer, we place a housing that is in the form of a hood 15; this hood is preferably constructed of galvanized iron and it is formed to extend down around and underneath the moving top portion of the conveyer and to extend across the top of and above the conveyer to form a commodious steam confining space within it. This hood, however, is provided with side openings 16, that permit the top part of the conveyer and the trays to travel through it.

Inside of this hood we place two groups or coils of perforated pipe 17, one below and one above the conveyer, which are arranged to extend transversely across the conveyer. Each of these steam groups of pipes are preferably arranged in a horizontal plane at a short distance above and below the chain conveyer and the traveling trays.

The groups of pipes above the conveyer have their perforations along the bottom of the pipes so that the steam will discharge downward against the sliced product in the trays, and the groups of pipes below the conveyer have their perforations along their top surfaces so as to discharge the steam up through the screen bottom of the trays against the bottom of the sliced product therein.

A pipe 18, extends from the groups of pipes to a supply of steam, and a valve 19, is placed in the pipe within handy reach of the attendant who has charge of the conveyer.

We also arrange on the supporting frame of the conveyer and alongside of the steam hood, a group of perforated water discharging pipes 20. These water discharging pipes extend transversely across the conveyer, but only above the traveling conveyer and the trays, and its perforations are positioned on the underside of the pipes so as to discharge water on top of the sliced product in the trays as they are carried along under it by the conveyer.

A water supply pipe 21, in which a valve 22, is placed handy to an attendant extends to a supply of water with pressure enough to give a suitable water bleaching treatment to the sliced product in the trays. The operation is as follows:

The conveyer is a continuously running conveyer and its tray loading end extends to a conveyer 23, a fragment of which only is illustrated. This conveyer receives the sliced product from the fruit and vegetable slicing machine, which we do not illustrate, and discharges it at a predetermined point into the trays 10, a pile or stack 24, of which is positioned to receive it, and an attendant handles the trays and levels the sliced product in them as they are filled, and places them one at a time onto the shelved spaces formed in the conveyer to receive them, and they are moved by the conveyer to a predetermined point where they are taken by an attendant and loaded onto cars 25, and are forwarded to a hot air dehydrating treatment furnace, which we do not illustrate, as it and the slicing and sliced product apparatus do not form a part of our present invention, but are fully illustrated in our co-pending applications, Serial Nos. 264,708 and 264,710, filed Nov. 29, 1918.

The steam and water bleaching treatments are given to some sliced fruits and vegetables, but not to all, and those that require the steam bleaching treatment do not require the water bleaching treatment, and vice-versa.

When, however, a fruit or vegetable is being dehydrated that requires either one of these bleaching treatments, the attendant opens the valve of the steam or water supply pipe, whichever is desired, just as each tray full of sliced product enters the hood or moves under the water discharging pipes, and allows the steam or water to flow onto the sliced product all of the time a tray is passing through the steam hood or moving under the water discharging pipes, and then shuts off the supply of steam or water, as the case may be, until another tray arrives of these steam or water bleaching elements.

The steam flows down against the top of and up through the bottom of the screen bottom of the trays against all parts of the sliced product. The water, however, only flows down against the top and sides of the sliced product, but works more or less under it.

Our invention provides a new and novel tray loaded sliced product conveyer and an easy and quick operating apparatus for giving to the sliced product while being conveyed to further treatment, satisfactory steam and water bleaching treatment as and when desired, and while we have illustrated and described its preferred construction, we do not wish to be limited to it, as changes might be made without departing from the spirit of our invention.

Having described our invention, what we claim as new and desire to secure by Letters Patent, is:

1. In an apparatus of the character described, the combination of an endless chain conveyer, provided with angle-iron frames arranged to receive screen bottomed sliced product holding frames, and convey them along its top surface and discharge them at its end, with a hood surrounding the upper part of said conveyer and a row of steam distributing perforated pipes arranged above and also a row of steam distributing perforated pipes arranged below the upper part of said endless conveyer, and means for driving said conveyer.

2. In an apparatus of the character described the combination of an endless chain conveyer comprising connected parallel chains at intervals in its length with tray holding frames made of angle bars, said frames, being arranged to receive screen bottomed trays, with a housing through which the upper lap of said conveyer passes, and perforated pipes in said housing arranged above and below the said upper lap of said endless chain conveyer connected with a steam supply, whereby material carried by said screen trays may be given a steam bleaching treatment through the screened bottoms of said trays, as the said frames travel through the said housing.

3. In an apparatus of the character described, the combination of a power driven, endless conveyer, comprising connected parallel chains, square frames of angle-irons secured on said conveyer at predetermined distances apart, and arranged to receive screen trays; longitudinal slide-way supports for the chains on said conveyer; with a hood form of housing having openings in its opposite end, through which the upper part of said conveyer travels, and perforated pipes in said housing arranged above and below the said upper lap connected with a steam supply whereby material carried by said screen trays may be given a steam bleaching treatment, up through the bottom of said screen trays and against its surfaces on said trays, as said trays are moved through the said housing on said conveyer.

4. In an apparatus of the character described, the combination of an endless chain conveyer comprising connected parallel chains provided at intervals in its length with tray holding frames made of angle bars, said frames being arranged to receive screen bottomed trays, with a housing through which the upper lap of said conveyer passes, and perforated pipes in said housing arranged above and below the said upper lap of said endless chain conveyer and connected with a steam supply, whereby material carried by said screen trays may be given a steam bleaching treatment through the screened bottoms of said trays, as the said frames travel through the said housing, and with a group of perforated pipes outside said housing arranged above the said upper lap of said conveyer and connected with a water supply, whereby material carried in said screen trays by said conveyer may be given either a steam or a water bleaching treatment or both treatments, as desired.

In testimony whereof we affix our signatures in presence of two witnesses.

ROBERT REA.
FRANK W. WATERS.

Witnesses:
G. SARGENT ELLIOTT,
ELIZABETH SMITH.